C. S. VADNER.
PROCESS FOR THE TREATMENT OF COPPER ORES AND THE RECOVERY OF THEIR VALUES.
APPLICATION FILED DEC. 9, 1913.
1,111,874.  Patented Sept. 29, 1914.
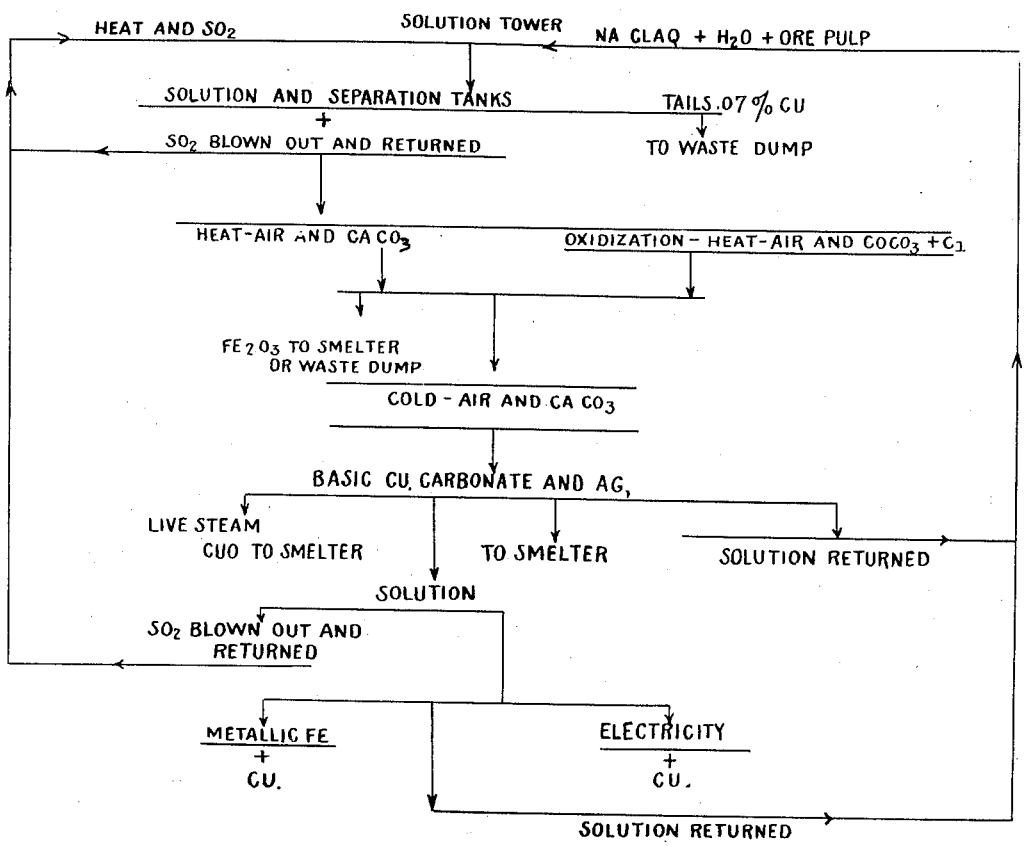

UNITED STATES PATENT OFFICE.

CHARLES S. VADNER, OF SALT LAKE CITY, UTAH.

PROCESS FOR THE TREATMENT OF COPPER ORES AND THE RECOVERY OF THEIR VALUES.

1,111,874.      Specification of Letters Patent.    Patented Sept. 29, 1914.

Application filed December 9, 1913. Serial No. 805,540.

*To all whom it may concern:*

Be it known that I, CHARLES S. VADNER, a citizen of the United States, a resident of Salt Lake City and Salt Lake county, State of Utah, have discovered a new and useful Process for the Treatment of Copper Ores and the Recovery of Their Values.

It is a well known fact that the recovery of copper and other values from ores by hydro-metallurgical methods presents serious difficulties with the final result that the ultimate cost of the copper and other values recovered is very high, except in one or two cases where the method of leaching with sulfuric acids and the subsequent recovery of the copper by precipitating with iron and by electrolysis is followed.

By means of my discovery, low grade ores that have heretofore been considered as carrying too little values to be successfully reduced can be treated at a small cost.

In my specifications where I refer to ores of copper I intend to include oxids, carbonates and sulfids. However the treatment of heavy sulfids would be so slow that it would be necessary to roast them sufficiently before applying my process for the abstraction of their values.

In my process which is diagrammatically represented in the accompanying drawing, naturally oxidized or sufficiently roasted ores (which may also contain other values such as gold, silver, and iron) are crushed to the necessary fineness either dry or in a solution of sodium chlorid. The strength of the solution depends on the amount of copper that the ore contains. The crushing in a salt solution is necessarily applied only in the final stage of the fine crushing. This can be done in a tube mill or other similar device wherein the use of iron is excluded thereby avoiding the danger of precipitating any copper dissolved by the solvent action of the salt solution in the crushing of the ore. By crushing the ore in a salt solution, the solvent action of the same materially reduces the time of exposure of the ores to the final solvent, thereby effecting a saving of time and expense of treatment without materially increasing the cost of crushing. Where no advantage can be derived by crushing as described in the salt solution, or where ores have to be roasted, the ores are first crushed dry and then made into a flowing pulp with a solution of sodium chlorid or any soluble chlorid. This solution can be of from 10 to 20 per cent. and is placed in any suitable tank. The liquid pulp is then showered or sprayed down a tower up which a current of sulfurous gas is caused to pass. The operation is repeated if necessary until the extraction of the copper and other values contained in the ores is completed. The pulp and the solution fall into a sump at the bottom of the tower where it is tested and if the extraction is not satisfactory the pulp is returned to the top of the tower, or, in case that more than one tower is used and the force of gravity can be utilized, it is led by gravity to the top of a second tower. In a case where the extraction is satisfactory, the undissolved pulp and solution is led to a settling tank and allowed to settle. The clear solution is then decanted and permitted to drain. The bottom of the treatment tank may either be made with a filter bottom or the pulp may be filter pressed. The insoluble residue from which the values have been extracted as far as it is found profitable to so do, is rejected. The solution of copper ores by means of sulfurous gas and water is by no means new, but where said treatment has been attempted on a large scale without the use of salt, has been a miserable failure for the reason that the solvent action of the solution is hastened by the use of heat; the resulting solution readily decomposes and precipitates the red cuprbso cupric sulfite $(Cu_2SO_3-Cu\ .\ .\ 2H_2O)$ even in the mass of pulp and when said precipitate is once formed it is practically impossible to redissolve same by a solution of sulfur dioxid in water. Again the solvent action of such a solution on the gold and silver values contained in various ores is not sufficiently completed.

I make use of heat in my process to hasten it. The presence of an excess of salt or other soluble chlorid in the solution precludes the danger of the above red precipitate forming and should a slight precipitation form from the chilling of the solution a little live steam will readily clear it up.

Copper ores are not especially soluble in salt solution but a salt solution impregnated with sulfur dioxid gas becomes a powerful solvent of copper ores and the values contained therein.

1. Leaching solution.

$$XNaCl + XH_2O + XSO_2 = X(NaCl\ aq) + H_2SO_3$$

2. Dissolving various ores.

Green copper carbonate:
 A. Malachite (as orthocarbonate.)—
$$Cu_4CO_4aq + (XNaCl)2H_2SO_3 = 2Cu_2SO_3(XNaCl\ aq) + 2H_2O + CO_2$$

B. Malachite (as metacarbonate.)—
$$Cu_2CO_3 2CuOH + (XNaCl)2H_2SO_3 = Cu_2SO_3(XNaCl) + 3H_2O + CO_2$$

Blue copper carbonate:
 C. Lasurite (as orthocarbonate.)—
$$Cu_3HCO_4 + (XNaCl)3H_2SO_3 = 3Cu_2SO_3(XNaCl) + 2CO_2 + 4H_2O$$

D. Red oxid copper.—
$$Cu_2O + (XNaCl)H_2SO_3 = Cu_2SO_3(XNaCl) + H_2O$$

E. Spathic iron ore.—
Ferrous carbonate
$$Fe_2CO_3 + (XNaCl) + 4H_2SO_3 + 2H_2O = Fe_2SO_3 3H_2O(XNaCl) + CO_2$$

F. Ferric oxid.—
$$Fe_2O_3 + (XNaCl) + 3H_2SO_3 = Fe_2(SO_3)_3(XNaCl) + 3H_2O$$
Red ferric sulfite and red ferric sulfite decomposes as follows:
$$Fe_2(SO_3)_3 = 2FeSO_3 + SO_3$$
Ferrous sulfite

3. Precipitation of ferric oxid.

Ferrous sulfite
$$2FeSO_3 + (XNaCl\ aq) + CaCO_3 = Fe_2O_3(XNaCl\ aq) + SO_2 + CO_2$$

4. Precipitation of basic copper carbonate.

$$2Cu_2SO_2 + (XNaCl\ aq) + 2CaCO_3 = Cu_4CO_4aq + 2CaSO_3 + CO_2$$
Cuprous sulfite

5. Formation of black oxid of copper.

$$Cu_4CO_4aq = CuCO_3 + Cu(OH_2) + H_2O + heat = 2CuO + CO_2 + 2H_2O$$
Basic ortho copper carbonate.   Black oxid of copper

6. Recovery of copper by electricity.

$$Cu_2SO_3 + H_2O + electricity = 2Cu + H_2SO_3 + O$$
and
$$H_2SO_3 = SO_2 + H_2O$$

7. Recovery of copper by iron.

$$Cu_2SO_3 + Fe + 3H_2O = 2Cu + FeSO_3 3H_2O$$

The advantages of using sulfur dioxid gas in connection with the salt solution are as follows:

(a) The gas in a dry state has little or no acid reaction, but owing to the presence of water in the salt solution, it imparts to the same a strong acid and quick solvent action.

(b) The ease with which sulfur dioxid is driven out by heat or a current of compressed air from a solution of same in salt enables the useless acidity due to the presence of excess of dissolved sulfur dioxid gas, to be easily and cheaply gotten rid of and recovered for the subsequent treatment of other ores.

(c) The cheapness of salt in general and also the sulfur dioxid gas which can be readily obtained by burning common sulfur or from the roasting of ores by any suitable means.

(d) The fact that in smelting sulfur dioxid gas is a nuisance and its useful application to low grade ores for the extraction of its values is certainly the practical application of scientific chemical metallurgy.

(e) The slight solubility of sulfur dioxid gas as above used amounting from one to two per cent. whereby the cost of heat or compressed air used later on to rid the solution of the excess of said gas is proportionately small.

The clear solution decanted in the treatment tank as above mentioned is treated as follows: If it is desired to separate any iron the same may contain, from the copper the solution is treated while hot, with finely pulverized calcium carbonate whereby the iron is eventually precipitated as ($Fe_2O_3$) ferric oxid. By not completely neutralizing the solution with calcium carbonate, the amount of iron precipitated can be regulated to suit the purpose of the application of the process. Before precipitating the calcium carbonate, the excess of sulfur dioxid can be gotten rid of either by heat or by blowing compressed air through the solution. The ferric oxid so precipitated is granular and readily settles to the bottom of the tank and is easily separated by decantation from the copper solution the iron can be entirely precipitated by adding finely pulverized calcium carbonate until the solution is neutral and then heating with live steam. Any arsenic present will also be precipitated along with the iron as ferric arsenite. It is not necessary before using this process to oxidize the iron from the ferrous to the ferric condition. By using heat the complete precipitation of the iron can be readily obtained. In case it is found desirable to previously oxidize the iron it can be readily done by compressed air or a small current of chlorin gas. The oxid of iron thus obtained can be used as flux for the smelters or for the production of metallic iron. The resulting solution is allowed to cool and upon addition of more pulverized calcium carbonate together with the use of a current of compressed air blown through the solution, the copper in the said solution is readily and completely thrown down as a green basic carbonate which can be readily separated by any suitable means from the remaining solution. Any silver contained in the solution is precipitated at the same time. If it is desired to recover the copper from the above green precipitate by smelting then this precipitate is washed with water and live steam, whereby the said green precipitate is reduced to the black oxid of copper—CuO—which is of comparatively small bulk and of high values in copper and also contains the precipitated silver. The mother liquor from the precipitation of the copper can be allowed to stand, whereby any excess of calcium sulfate in solution formerly present as calcium sulfite and oxidized to calcium sulfate as above mentioned either in the process of oxidizing the iron from ferrosum to ferricum, or in the precipitation of the copper is allowed to settle out of the solution. The now cool solution can be again used in connection with sulfur dioxid gas as a solvent for more ore. If it is desired the iron and the copper can be precipitated as above described and recovered together. In either case the silver and the gold contained in the ore will be precipitated with the copper and recovered.

If it is desired for any reason to precipitate the copper before the iron, same can be accomplished by allowing the solution to cool and precipitating the copper as above described whereby little or none of the iron will be precipitated. I also provide in my process for the recovery of the copper by the use of iron or electricity where cheap iron or cheap electrical power can be had. Where it is not desirable to smelt the copper precipitated as above described, the same is made into a pulp with water and exposed as before mentioned to sulfur dioxid gas; the resulting solution is freed of the excess of sulfur dioxid as before mentioned and the copper can be recovered where cheap iron is available by ridding the original solution of sulfur dioxid by air or heat and passing the solution over iron in any suitable manner. By this treatment the iron displaces the copper yielding ferrous chlorid and metallic copper which is recovered and cast into pigs. The ferrous chlorid can be used in connection with sulfur dioxid for the further solution of copper ores. The absence of free acids and ferric salts would minimize the amount of iron consumed to the very lowest point and at the same time regenerate a solvent ferrous chlorid which when used by itself would hardly be considered efficient as a solvent of copper ores, but which when saturated with sulfur dioxid is very efficient. The recovery of the copper by electricity where electricity is cheap is accomplished as follows: The copper precipitate is dissolved in a solution of sulfur dioxid in any suitable manner and the copper is recovered by electrolyzing the said solution in any ordinary way at a low voltage. By this means little or no oxidization of the sulfur dioxid gas occurs, a greater part of it being driven off in a free condition especially if the solution is heated. What is driven off can be used for the subsequent solution of more ore. If the slight oxidation that does take place is confined to the calcium sulfite, contained in the solution being oxidized to calcium sulfate, it being quite insoluble, it is precipitated and sinks to the bottom of the electrolyzing tank.

Having thus described my process what I claim as new and desire to secure by Letters Patent is as follows:

1. The process which consists in dissolving naturally oxidized and sufficiently roasted sulfid ores of copper in a solution of sodium chlorid saturated with sulfur dioxid gas in the presence of heat, blowing out the excess of sulfur dioxid gas and precipitating the copper as a basic copper carbonate, by adding finely pulverized calcium carbonate, to the cold solution and passing air through the same.

2. The process which consists in dissolving naturally oxidized and sufficiently roasted sulfid ores of copper in a solution of sodium chlorid saturated with sulfur dioxid in the presence of heat, and separating the undissolved portions and getting rid of any excess of sulfur dioxid by passing a current of compressed air through the solution, and treating said solution while hot with finely pulverized calcium carbonate whereby the ferric hydrate formed reacts with the arsenic and eliminates same from the solution as ferric arsenite.

3. The process which consists in dissolving oxidized and sufficiently roasted sulfid ores of copper in a solution of sodium chlorid saturated with sulfur dioxid gas in the presence of heat, separating the undissolved portions of ore and getting rid of any excess of sulfur dioxid by passing a current of compressed air through the solution and treating the solution while hot with finely pulverized calcium carbonate, thereby precipitating the iron as ferric oxid; allowing the solution to cool, precipitating the copper and silver contained therein by the addition of additional finely pulverized calcium carbonate, passing a current of compressed air through the solution, thereby precipitating the copper as green basic carbonate together with the silver, then separating the precipitate by filtration.

4. The process which consists in dissolving naturally oxidized and sufficiently roasted sulfid ores of copper in a solution of sodium chlorid saturated with sulfur dioxid gas in the presence of heat, separating the undissolved portions of ore by dacantation and filtration, getting rid of any excess of sulfur dioxid by passing a current of compressed air through the solution, treating the solution while hot with finely pulverized calcium carbonate and thereby precipitating the iron as ferric oxid; then allowing the solution to cool and precipitating the copper and silver contained therein by addition of additional finely pulverized calcium carbonate and passing a current of compressed air through the solution, thereby precipitating the copper as a green basic carbonate together with the silver, then separating the precipitate and dissolving same in sulfur dioxid and water and then blowing out the excess of sulfur dioxid gas with compressed air and recovering the copper.

In witness whereof I have hereunto set my hand in the presence of two subscribing witnesses.

CHARLES S. VADNER.

Witnesses:
EVVA OSBORN,
SAMUEL CARLISLE.